United States Patent
Ooe et al.

(10) Patent No.: US 9,366,353 B2
(45) Date of Patent: Jun. 14, 2016

(54) CONTROL VALVE DRIVEN BY STEPPING MOTOR

(71) Applicant: TGK CO., LTD., Tokyo (JP)

(72) Inventors: Yuto Ooe, Tokyo (JP); Kazushi Takahashi, Tokyo (JP); Tomohiro Yuasa, Tokyo (JP)

(73) Assignee: TGK CO., LTD, Tokyo (JP)

( * ) Notice: Subject to any disclaimer, the term of this patent is extended or adjusted under 35 U.S.C. 154(b) by 140 days.

(21) Appl. No.: 14/226,755

(22) Filed: Mar. 26, 2014

(65) Prior Publication Data

US 2014/0291562 A1 Oct. 2, 2014

(30) Foreign Application Priority Data

Mar. 29, 2013 (JP) ................................ 2013-073255

(51) Int. Cl.
*F16K 31/04* (2006.01)
*F25B 41/06* (2006.01)

(52) U.S. Cl.
CPC ............... *F16K 31/04* (2013.01); *F25B 41/062* (2013.01); *F25B 2341/0653* (2013.01); *Y02B 30/72* (2013.01)

(58) Field of Classification Search
CPC .. F25B 1/00; F25B 41/062; F25B 2341/0653; F16K 31/04; Y02B 30/72
USPC .......................... 251/129.11–129.13, 366–367
See application file for complete search history.

(56) References Cited

U.S. PATENT DOCUMENTS

| | | | | |
|---|---|---|---|---|
| 4,275,764 A * | 6/1981 | Baret | ...................... | F16K 21/04 137/454.6 |
| 6,460,567 B1* | 10/2002 | Hansen, III | ............. | F16K 31/04 137/554 |
| 2003/0089871 A1* | 5/2003 | Hashimoto | ........... | F16K 31/047 251/129.11 |
| 2006/0202145 A1* | 9/2006 | Ricco | ................... | F02M 47/027 251/129.16 |
| 2008/0029724 A1* | 2/2008 | Hara | .................. | F16K 31/52408 251/129.11 |
| 2009/0294713 A1* | 12/2009 | Harada | ................... | F16K 31/04 251/129.15 |

FOREIGN PATENT DOCUMENTS

| | | |
|---|---|---|
| JP | 2012-062952 | 3/2012 |
| JP | 2012-062953 | 3/2012 |

* cited by examiner

*Primary Examiner* — John Bastianelli
(74) *Attorney, Agent, or Firm* — Martine Penilla Group, LLP

(57) ABSTRACT

A control valve according to an embodiment includes: a body having an inlet port, an outlet port, and a valve hole that communicates the inlet port and the outlet port together; a valve element configured to open and close a valve section; a drive mechanism configured to drive the valve element; a stepping motor having both a rotor for operating the drive mechanism and a stator for rotationally driving the rotor; and a can that is a cylindrical member covering a space where the valve element and the drive mechanism are arranged and involving the rotor and that defines a pressure space and a non-pressure space. The can is fixed to the body with a ring screw, and the stator is arranged at an outer circumference of the can and fixed to the body with a screw member.

6 Claims, 6 Drawing Sheets

CONTROL VALVE DRIVEN BY STEPPING MOTOR

CLAIM OF PRIORITY TO RELATED APPLICATION

The present application is claiming priority of Japanese Patent Application No. 2013-073255, filed on Mar. 29, 2013, the content of which is incorporated herein by reference.

BACKGROUND OF THE INVENTION

1. Field of the Invention

The present invention relates to a control valve driven by a stepping motor, and in particular, to a control valve that can be miniaturized while required pressure resistance and a structure robust against vibrations (vibration resistance) are being maintained.

2. Description of the Related Art

An automotive air conditioner has a refrigeration cycle including a compressor, an external heat exchanger, an evaporator, and an internal heat exchanger, etc., and the functions of the external heat exchanger are switched to each other between a heating operation and a cooling operation. During the heating operation, the external heat exchanger functions as an evaporator. In the case, the internal heat exchanger radiates heat while a refrigerant is circulating the refrigeration cycle, the heat heating the air in the interior of a vehicle. On the other hand, during the cooling operation, the external heat exchanger functions as a condenser. In the case, the refrigerant condensed in the external heat exchanger evaporates in the evaporator, the latent heat of the evaporation cooling the air therein. At the time, the air is also dehumidified.

When a plurality of evaporators function in accordance with an operating state of a refrigeration cycle in this way, it is necessary to adjust a ratio of flow rates of a refrigerant flowing through the respective evaporators. The same is true with the case where a plurality of condensers function. Accordingly, a control valve whose opening degree can be electrically adjusted is sometimes provided at a specific position in a refrigerant circulation passage, and in general, an electromagnetic valve driven by a solenoid, by which large drive force can be obtained at a relatively low cost, is often used. When it is necessary to precisely control an opening degree of a valve, however, it is desirable to use a control valve driven by a stepping motor, as frequently seen in residential air conditioners.

Because an automotive air conditioner is greatly influenced by vibrations occurring during vehicle running, an environment in which the air conditioner is installed is not stable, unlike a residential air conditioner. In addition, both a valve element that forms a control valve and a drive mechanism that drives the valve element are arranged in a refrigerant passage where the pressure of a refrigerant acts. Accordingly, the drive mechanism of the control valve, including a stepping motor, is arranged in a housing having pressure resistance in order to surely prevent the refrigerant from leaking out. In addition, the housing is firmly fixed to the body of the control valve in order to secure a structure robust against vibrations (a structure having high vibration resistance), the structure being sufficiently able to withstand the vibrations received from a vehicle (see, for example, Patent Documents 1 and 2).

RELATED ART DOCUMENTS

Patent Documents

[Patent Document 1] Japanese Patent Application Publication No. 2012-62952

[Patent Document 2] Japanese Patent Application Publication No. 2012-62953

In a control valve driven by a stepping motor, however, if both the stepping motor and a drive mechanism operated by the stepping motor are firmly fixed to the body of the control valve while a refrigerant is being surely prevented from leaking out, as described above, it is necessary to make a housing, in which the above two components are housed, have sufficient pressure resistance, causing the housing itself to be made large in size. The body of the control valve, to which the housing is fixed, also becomes large in size in accordance with the size of the housing. It is further necessary to make a fastening structure for fixing the housing to the body to become large in size and have high strength. As a result, such a pressure-resistant structure and a vibration-resistant structure cause a control valve to become large in size as a whole.

SUMMARY OF THE INVENTION

A purpose of the present invention is to provide a control valve driven by a stepping motor that can be miniaturized while meeting required pressure resistance and vibration resistance.

In order to solve the aforementioned problems, a control valve according to an embodiment of the present invention is a control valve driven by a stepping motor, comprising: a body having an inlet port for introducing a refrigerant from an upstream side, an outlet port for delivering a refrigerant to a downstream side, and a valve hole that communicates the inlet port and the outlet port together; a valve element configured to open and close a valve section by moving toward and away from the valve hole; a drive mechanism configured to drive the valve element in an opening and closing direction of the valve section; a stepping motor including both a rotor for operating the drive mechanism and a stator for rotationally driving the rotor; and a can that is a cylindrical member covering a space where the valve element and the drive mechanism are arranged and involving the rotor and that defines a pressure space where pressure of the refrigerant acts and a non-pressure space where pressure of the refrigerant does not act. The can is fixed to the body with a first fixing means, and the stator is arranged at an outer circumference of the can and fixed to the body with a second fixing means.

According to this embodiment, a can covering a valve element, a drive mechanism, and a rotor, etc., which are arranged in a pressure space where the pressure of a refrigerant acts, is fixed to a body with a first fixing means, while a stator, which is arranged outside the can and in a non-pressure space where the pressure of a refrigerant does not act, is fixed to the body with a second fixing means. That is, the aforementioned components are fixed to the body with different fixing means. As a result, a fixing means, having smaller fixing force than that of the first fixing means for fixing a can on which the pressure of a refrigerant acts, can be adopted as the second fixing means for fixing a stator on which the pressure of a refrigerant does not act. That is, the second fixing means can be miniaturized and simplified, which can contribute to the miniaturization of a control valve as a whole. Further, the second fixing means, used for fixing the stator on which the pressure of a refrigerant does not act, and the first fixing means, used for fixing the can on which the pressure of a refrigerant acts, can be respectively selected so as to achieve optimal fixing force, and hence the fixing means can be selected from wider options and design flexibility can be improved.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 1A to 1C are outline views of a control valve driven by a stepping motor according to an embodiment: in which FIG. 1A is a view seen from an outlet port side; FIG. 1B is a view seen from an inlet port side; and FIG. 1C is a view seen from an upper surface side of the stepping motor;

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Hereinafter, preferred embodiments of the present invention will be described in detail with reference to the accompanying drawings. In the following embodiments, the case where a control valve driven by a stepping motor is applied, as an example of use, to an automotive air conditioner will be described.

An automotive air conditioner generally includes a refrigeration cycle (refrigerant circulation circuit) in which a compressor, an internal condenser, an external heat exchanger, an evaporator, and an accumulator are connected together by pipes. The automotive air conditioner can be configured as an air conditioner driven by a heat pump, in which air conditioning in the interior of a vehicle is performed by using the heat of a refrigerant in a course in which an alternative for chlorofluorocarbon (HFC-134a, HFO-1234yf, etc.), CO2, or the like, circulates, as the refrigerant, through the refrigerant circulation circuit while changing its states. Various control valves for properly controlling the air conditioning are arranged in the refrigerant circulation circuit. A control valve driven by a stepping motor is used in a section where it is particularly necessary to control in detail a flow rate of the refrigerant flowing through the refrigerant circulation circuit.

Figure 1A:
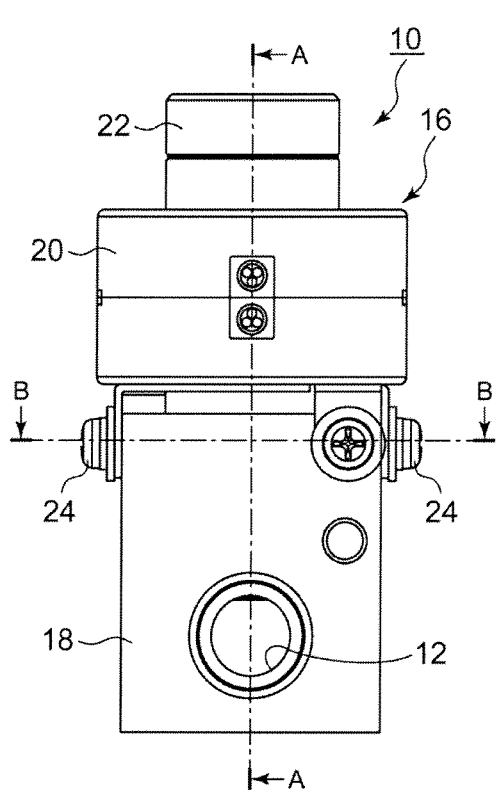
Figure 1B:
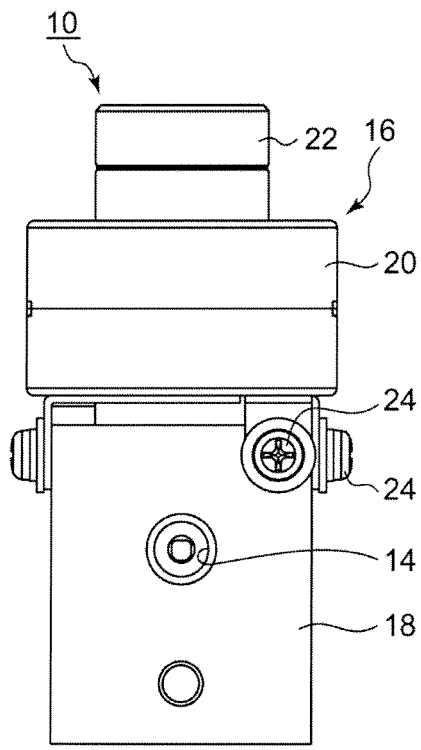
Figure 1C:
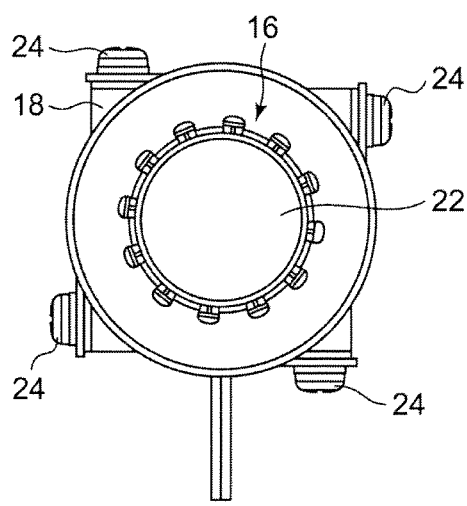

FIGS. 1A to 1C are outline views of a control valve 10 driven by a stepping motor: in which FIG. 1A is a view seen from an outlet port 12 side, the outlet port 12 being an exit from which a refrigerant passing through the control valve flows out; FIG. 1B is a view seen from an inlet port 14 side, the inlet port 14 being an entrance from which a refrigerant to be supplied to the control valve 10 flows in; and FIG. 1C is a view seen from an upper surface side of a stepping motor 16.

The control valve 10 is configured as a proportional valve in which the opening degree of the valve is autonomously adjusted to a preset one in accordance with the number of supply pulses of the stepping motor 16. This control valve 10 functions, for example, as an expansion device with a valve opening degree being throttled. The control valve 10 also functions as a flow rate adjustment device for a refrigerant flowing downstream with an opening degree being appropriately adjusted. The control valve 10 further functions as a passage closing device with being made to be in a fully closed state.

As illustrated in FIG. 1A, the control valve 10 is assembled in a form in which the stepping motor 16 that forms a motor unit is mounted on one end of a body 18 that is a valve main body. The body 18 can be formed by cutting a metal, such as, for example, aluminum. In the body 18, the inlet port 14 for introducing a refrigerant from an upstream side and the outlet port 12 for delivering a refrigerant to downstream side are communicated with each other inside the body 18 through the later-described valve hole. Opening and closing of a valve section, that is, both adjustment of a communication state between the inlet port 14 and the outlet port 12 and closing of communication between them, can be achieved with a valve element moving toward and away from a valve seat formed on the valve hole. The valve element can be driven in the opening and closing direction of the valve section by a drive mechanism for converting a rotational motion of the stepping motor 16 into a translational motion. The stepping motor 16 is formed by both a rotor connected to the drive mechanism (a rotor core is directly connected to the drive mechanism) and a stator 20 for rotationally driving the rotor. The rotor, the valve element, and the drive mechanism for driving the valve element are arranged in the same space as that for a refrigerant passage. That is, these components are arranged in a pressure space. A can 22, which defines the pressure space where the pressure of a refrigerant acts and a non-pressure space where the pressure of a refrigerant does not act, is connected to an upper surface portion of the body 18. The can 22 is a cylindrical member that covers the space where the valve element and the drive mechanism are arranged and that involves the rotor.

In the control valve 10 of the present embodiment, the body 18 and the can 22 are fixed together with the later-described first fixing means, for example, with a screw member, so that the airtightness of the pressure space can be maintained. On the other hand, the stator 20 in the stepping motor 16 is arranged at the outer circumference of the can 22 and fixed to the body 18 with a second fixing means, for example, with a screw member 24. In the present embodiment, the can 22, covering the pressure space and having a pressure-resistant structure, is fixed with the first fixing means, while the stator 20, arranged in the non-pressure space outside the can 22, is fixed with the second fixing means, and hence the can 22 and the stator 20 can be respectively fixed with optimal fixing means in accordance with an application, as described later. In particular, the second fixing means is not required to have a pressure-resistant performance, and hence a fixing means having low strength can be adopted, which can contribute to the miniaturization of the control valve 10 as a whole. Further, the fixing means can be selected from wider options.

Figure 2:
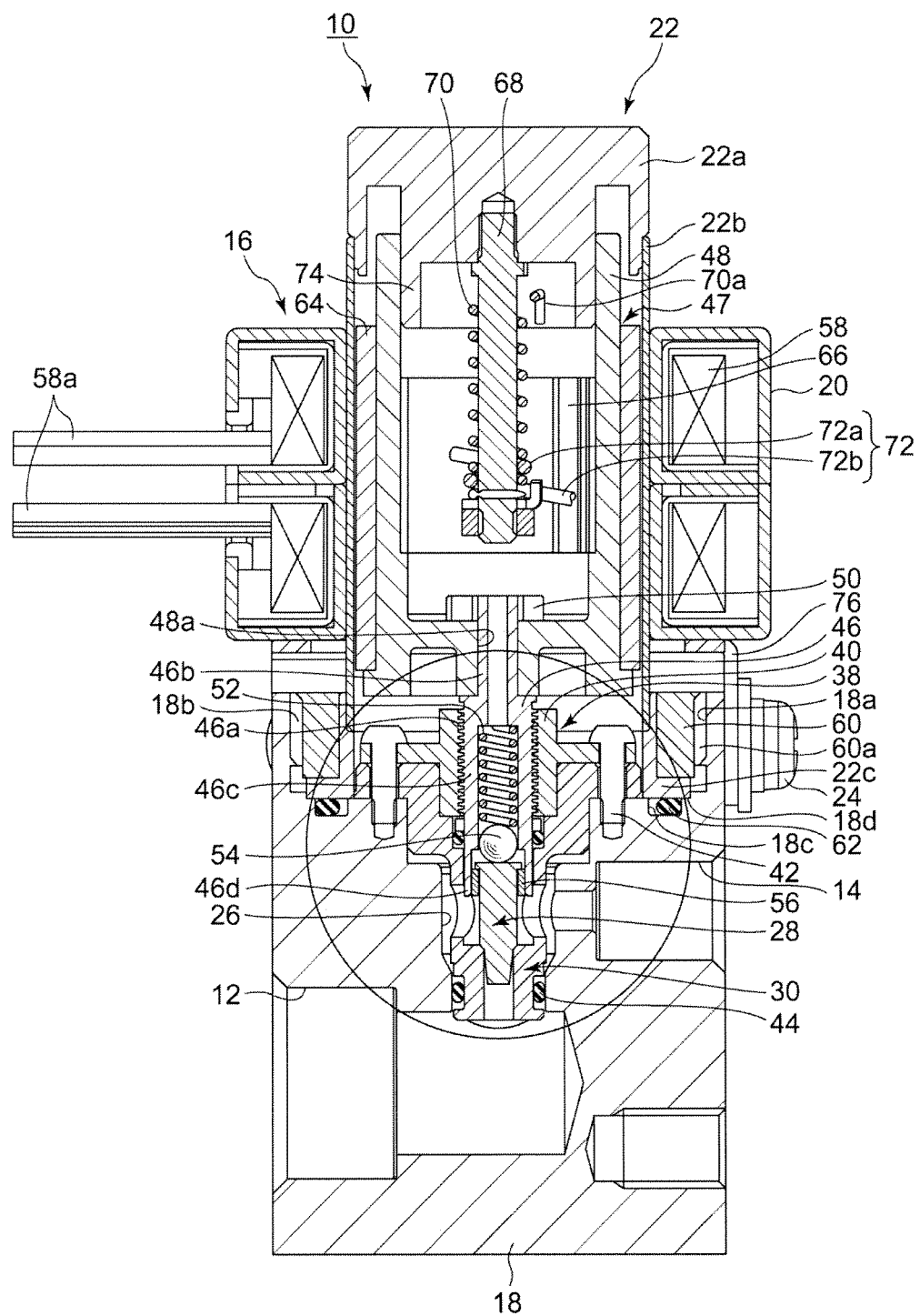
FIG. 2 is a sectional view, taken along A-A Line in FIG. 1A.
Figure 3:
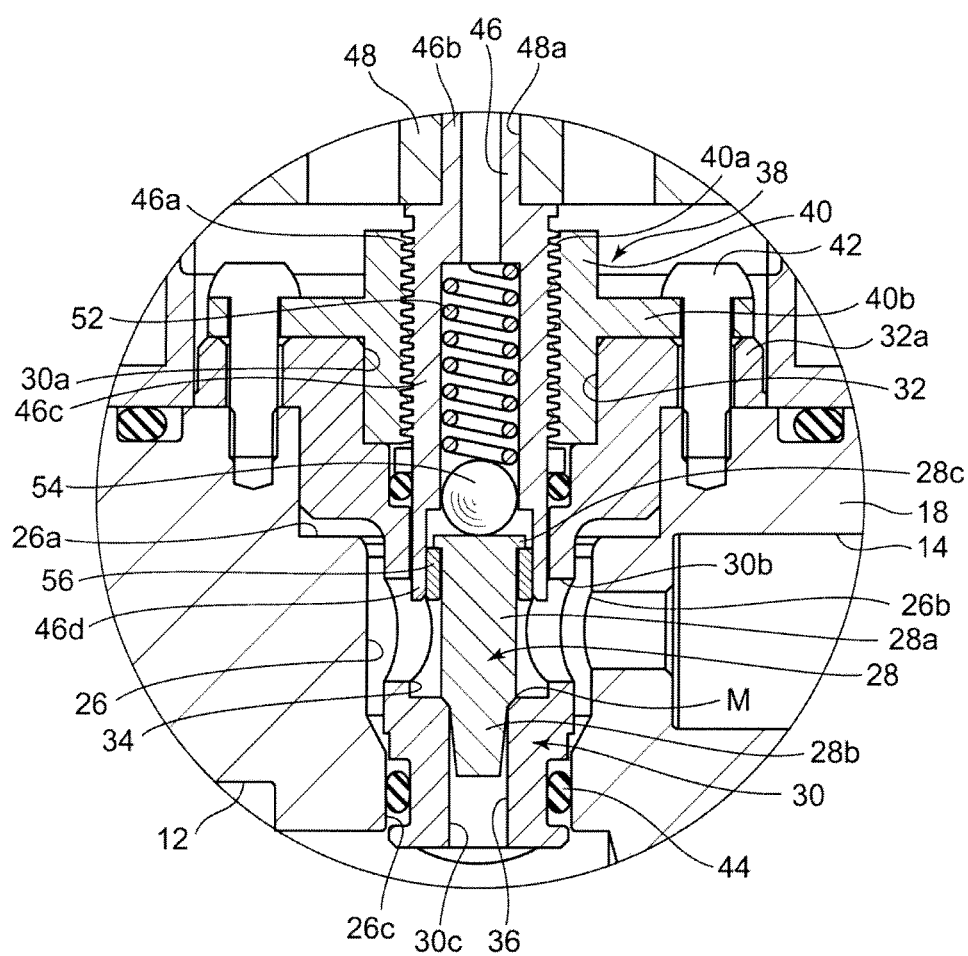
FIG. 3 is an enlarged view of a periphery of a valve element and a drive mechanism in FIG. 2.

The structure of the control valve 10 will be described in detail with reference to FIGS. 2 and 3. FIG. 2 is a sectional view, taken along A-A Line in FIG. 1A. FIG. 3 is an enlarged view of a periphery of the valve element and the drive mechanism in FIG. 2.

The body 18 has a bottomed cylindrical shape and is provided with both the inlet port 14 in one side of the body 18 and the outlet port 12 in the other side thereof, the inlet port 14 and the outlet port 12 being connected together by a communication passage 26. The communication passage 26 is formed along the axis line of the body 18 (central axis of the body 18) and in the vertical direction in the views, and has: an opening end portion 26a at the top of the passage 26; a communication hole 26b that communicates with the inlet port 14 in the side surface thereof; and a communication hole 26c that communicates with the outlet port 12 in the bottom thereof. A guide member 30 is arranged in the communication passage 26, the guide member 30 having a hollow hole that functions as a valve hole for removably receiving a valve element 28 and including a valve seat M. The guide member 30 is a stepped cylindrical member, and has an opening end portion 30a at a position projected from the opening end portion 26a of the communication passage 26. The guide member 30 also has: a communication hole 30b at a position in the side surface of the guide member 30, the position corresponding to the communication hole 26b for the inlet port 14; and a communication hole 30c at a position in the bottom thereof, the position corresponding to the communication hole 26c for the outlet port 12.

In the hollow hole formed in the guide member 30, a stepped large-diameter portion 32, a medium-diameter portion 34, and a small-diameter portion 36 are formed in this order from the upper side (from the side where the stepping motor 16 is arranged). The small-diameter portion 36 functions as the valve hole. A drive mechanism 38 for driving the valve element 28 in the opening and closing direction is housed in the stepped large-diameter portion 32, a large-diameter portion 28a of the valve element 28 is housed in the medium-diameter portion 34, and a needle portion 28b of the valve element 28 is housed in the small-diameter portion 36.

A flange 32a extending radially outside is formed at the outer circumference of the stepped large-diameter portion 32 and fixed to the body 18 with, for example, a plurality of screws 42, along with an outer cylinder 40 that forms the drive mechanism 38. The boundary portion between the medium-diameter portion 34 and the small-diameter portion 36 serves as the valve seat M that contacts the valve element 28. Herein, a sealing member, for example, an O-ring 44 is interposed between the outer circumferential surface of the small-diameter portion 36 and the inner circumferential surface of the communication passage 26, so that the refrigerant introduced from the inlet port 14 is prevented from flowing into the outlet port 12 side without passing through the guide member 30. That is, it is made that the refrigerant introduced from the inlet port 14 flows into the outlet port 12 side only when the valve element 28 leaves the valve seat M in the guide member 30. When the outer cylinder 40 and the guide member 30 are fixed to the body 18, a fixing means, such as press-fitting, caulking, or the like, may be adopted instead of the aforementioned screws 42, if the fixing strength is secured.

The drive mechanism 38 is formed by both the outer cylinder 40, which is fixed to the body 18 along with the guide member 30, and an inner cylinder 46 involved in the outer cylinder 40. A female thread 40a is formed in the inner circumferential surface of the outer cylinder 40, and a flange 40b, which is fastened to the body 18 along with the flange 32a of the guide member 30, is formed in the outer circumferential portion of the outer cylinder 40. A male thread 46a, which is engaged with the female thread 40a in the outer cylinder 40, is formed in the outer circumferential surface of the inner cylinder 46. The inner cylinder 46 is formed by a small-diameter portion 46b, a large-diameter portion 46c, and a tip portion 46d. The small-diameter portion 46b is inserted into a fixing hole 48a formed at the lower end portion of a cylindrical rotor core 48 that forms a rotor 47 in the stepping motor 16, to be integrated with the rotor core 48 by being fixed, at its upper end portion, with a fastening means, such as a nut 50. Accordingly, the inner cylinder 46 rotates integrally with the rotor 47. When the inner cylinder 46, which is to be engaged with the outer cylinder 40, rotates integrally with the rotor 47, the inner cylinder 46 performs a translational motion in the opening and closing direction of the valve element 28 in accordance with a thread pitch, because the outer cylinder 40 is fixed to the body 18. That is, a valve opening amount of the valve element 28 can be controlled by controlling a rotation amount of the stepping motor 16. While the male thread 46a is formed in the outer circumferential surface of the large-diameter portion 46c, a spring 52 and a ball 54 are housed in the inner circumference thereof. A fixing bush 56 is fixed to the tip portion 46d by press-fitting, etc., so that the valve element 28 is slidably supported. A flange 28c is formed at the upper end portion of the valve element 28, so that the valve element 28 is configured not to drop from the inner cylinder 46 with the flange 28c being engaged with the fixing bush 56.

As illustrated in FIG. 2, the spring 52 always biases the valve element 28 in the valve closing direction via the ball 54 such that the flange 28c is pressed onto the fixing bush 56. Accordingly, when the valve element 28, along with the inner cylinder 46, moves in the valve closing direction with the rotation of the rotor 47, the lower end of the large-diameter portion 28a of the valve element 28, namely the root (stepped portion) of the needle portion 28b, first contacts the valve seat M. When the rotor 47 still rotates after the contact, the inner cylinder 46, along with the fixing bush 56, further moves in the valve closing direction, and hence the flange 28c leaves the fixing bush 56, while the valve element 28 is contacting the valve seat M. On the other hand, the valve element 28 receives biasing force from the ball 54 biased by the spring 52, and hence the valve can be surely closed. In this case, because a compression movement of the spring 52 has a cushioning effect, the valve element 28 is not excessively pressed onto the valve seat M, which can suppress wear. Further, even if the spring 52 is twisted with the rotation of the inner cylinder 46, the twisting force of the spring 52 is absorbed in the ball 54 and not transmitted to the valve element 28 by interposing the ball 54 between the spring 52 and the valve element 28. As a result, the valve element 28 can be stably biased in the valve closing direction without breaking an attitude balance of the valve element 28 after contacting the valve seat.

The stepping motor 16 includes the rotor 47 and the stator 20. The stepping motor 16 is configured to rotatably support the rotor 47 inside the bottomed cylindrical can 22 that defines a pressure space where the pressure of a refrigerant acts and a non-pressure space where the pressure of a refrigerant does not act. The stator 20, in which an exciting coil 58 is housed, is provided at the outer circumference of the can 22. The can 22 is fixed with the lower end opening portion thereof being positioned between a screw member as the second fixing means, specifically a ring screw 60, and the body 18.

Figure 4:
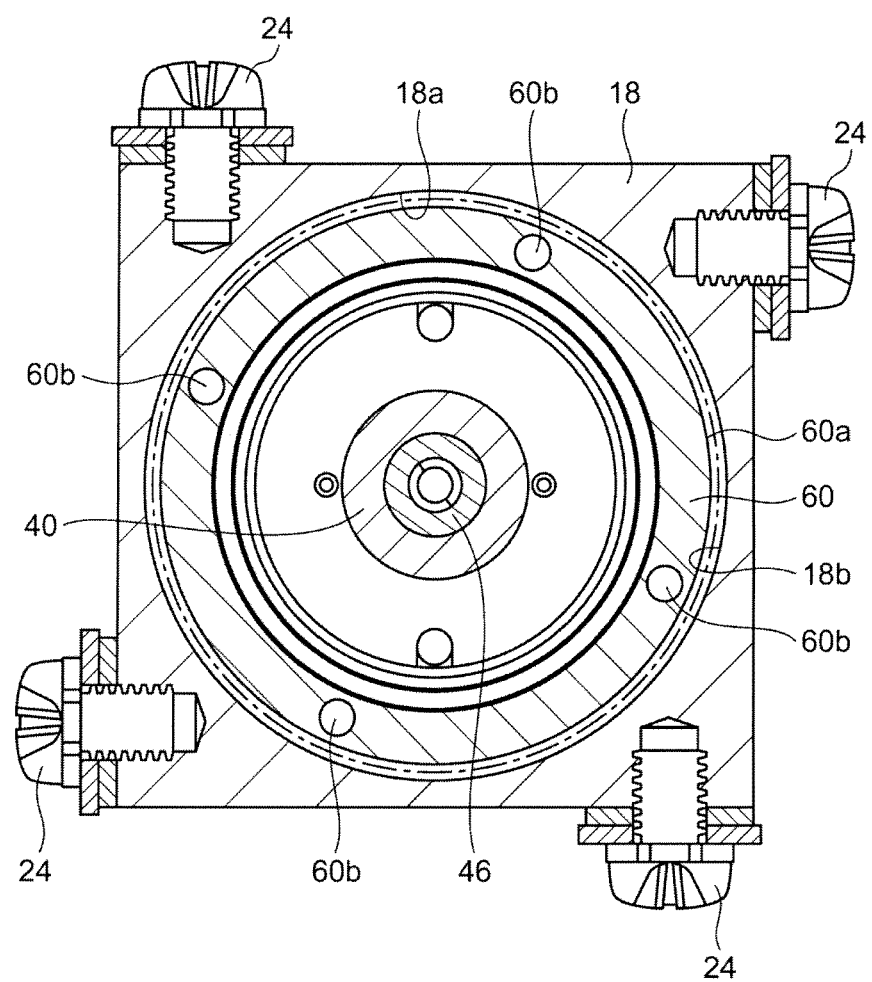
FIG. 4 is a sectional view, taken along B-B Line in FIG. 1A.

FIG. 4 is a sectional view, taken along B-B Line in FIG. 1A. FIG. 4 includes a sectional view of the ring screw 60. A male thread 60a formed in the outer circumferential surface of the annular ring screw 60 is screwed with a female thread 18b formed in the inner circumferential surface of a storage hole 18a formed in the body 18. A plurality of tool insertion holes 60b are formed in the ring screw 60 such that the ring screw 60 can be fastened or loosened by being rotated with a tool having, for example, a fork shape, being inserted into the tool insertion holes 60b. It is desirable that the storage hole 18a has a depth in which the ring screw 60 does not protrude from the opening end of the storage hole 18a when an O-ring 62 is compressively deformed to a predetermined amount by fastening the ring screw 60, that is, when the ring screw 60 is screwed to a position where a sufficient sealing function is secured. With this structure, occurrence of a defect, in which the ring screw 60 is insufficiently fastened when the control valve 10 is assembled, can be easily prevented, and the assembling work efficiency can be improved. A fixed portion 22c of the can 22 is configured such that, when fixed with the ring screw 60, the bottom of the fixed portion 22c contacts a stepped portion 18d formed outside a groove 18c for housing the O-ring 62. That is, the fixed portion 22 is configured to fix the can 22 at a position where the O-ring 62 is moderately compressed.

Referring back to FIG. 2, the can 22 is formed by a cap portion 22a, a thin trunk portion 22b, and the fixed portion 22c, which are connected together by a joining means, such as welding, to form a closed container, in the present embodiment. The fixed portion 22c has a flange extending radially outside, and is fixed with the flange portion being positioned between the ring screw 60 and the body 18. A sealing member, such as the O-ring 62, is installed in the lower surface of the fixed portion 22c, in order to maintain and improve the sealability of the can 22.

The rotor 47 is rotatably housed in the can 22. The rotor 47 includes both the rotor core 48 formed into a cylindrical shape and a magnet 64 arranged at the outer circumference of the rotor core 48.

A guide part 66, extending in parallel to the axis line of the can 22, is provided inside the rotor core 48. The guide part 66 forms a projecting part for being engaged with the later-described rotation stopper, and is formed by one protrusion extending in parallel to the axis line.

A lengthy shaft 68 is arranged inside the rotor core 48 and along the axis line thereof. The upper end portion of the shaft 68 is fixed in a cantilevered manner to the center of the cap portion 22a of the can 22 by screwing, welding, or press-fitting, and the shaft 68 extends in parallel to the guide part 66 and in the internal space of the can 22. The shaft 68 is arranged on the same axis line as that of the valve element 28. A guide part 70 having a spiral shape, extending across almost the entire length of the shaft 68, is provided in the shaft 68. The guide part 70 is formed of a coil-shaped member and is fitted around the outer surface of the shaft 68. The upper end portion of the guide part 70 is folded back to serve as a stopper 70a.

A rotation stopper 72 having a spiral shape is rotatably engaged with the guide part 70. The rotation stopper 72 has both an engagement part 72a having a spiral shape, which is engaged with the guide part 70, and a power transmission part 72b supported by the rotor core 48. The engagement part 72a has a shape of a single-turn coil, and the power transmission part 72b extending radially outward is successively provided in a lower end portion of the engagement part 72a. A tip portion of the power transmission part 72b is engaged with the guide part 66. That is, the power transmission part 72b is stopped by contacting one of the protrusions of the guide part 66. Accordingly, a displacement of the rotation stopper 72, occurring in the axis line direction of the guide part 66 while sliding on the guide part 66, is allowed, while a relative displacement thereof occurring in the rotating direction is regulated by the rotor core 48.

That is, the rotation stopper 72 is driven in the axis line direction of the guide part 66 by rotating integrally with the rotor 47 and with the engagement part 72a thereof being guided along the guide part 66. However, a range in which the rotation stopper 72 is driven in the axis line direction is regulated by stoppers formed on both ends of the guide part 66. In the view, a state where the rotation stopper 72 is located at the bottom dead center is illustrated. When the rotation stopper 72 is displaced upward and stopped by the stopper 70a, the position becomes a top dead center.

The upper end portion of the rotor core 48 is rotatably supported by a bearing part 74 formed in the cap portion 22a of the can 22. The lower end portion thereof is supported with the male thread 46a, provided on the outer surface of the inner cylinder 46 joined to the lower end portion, being engaged with the female thread 40a, provided on the inner surface of the outer cylinder 40 fixed to the body 18 side. That is, the drive mechanism 38 functions as a bearing on the lower end side. With this structure, a bearing component for supporting the rotor 47 can be reduced. Further, a substantial sliding portion can be reduced by the reduction of a bearing component, which can suppress wear occurring due to sliding.

Figure 5:
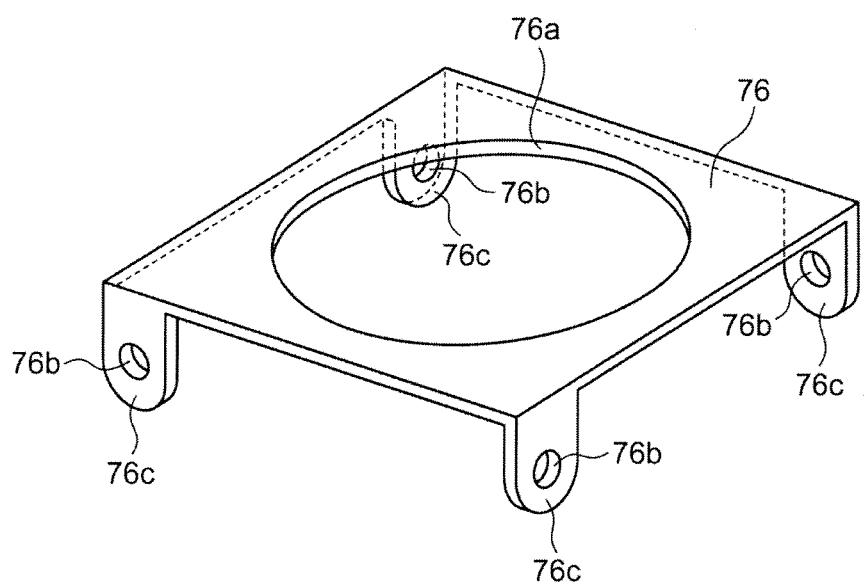
FIG. 5 is a perspective view of a bracket for fixing a stator to a body.

On the other hand, the annular stator 20 for rotationally driving the rotor 47 is arranged at the outer circumference of the can 22 and fixed to the body 18 alone. Specifically, the screw member 24 is used as the second fixing means to fix the stator 20 to the body 18. The stator 20 is fixed to the body 18 by using a first wall surface of the body 18 (side surface of the body 18) different from a second wall surface thereof (upper surface of the body 18) to which the can 22 is fixed. In the example illustrated in FIG. 2, the stator 20 is fixed with a plate-shaped bracket 76, which will be illustrated in FIG. 5, being screwed to the side surface of the body 18.

The bracket 76 can be obtained, for example, by pressing a metal plate. In the case of the example of FIG. 5, an opening 76a, through which the can 22 is inserted, is formed in the central portion of a thin plate material, and stays 76c, each having a hole 76b through which the screw member 24 for fixation is inserted, are formed by being folded back at the four corners of the plate material. Herein, the number of the stays 76c can be appropriately selected in consideration of vibration resistance (vibration-resistant performance by which the stator 20 may not be shifted or drop due to vibrations) and the weight of the stator 20, etc., and for example, two stays may be provided at opposing corners, or one stay may be provided. Or, four or more stays may be provided (two or more of those may be provided in one side). In the present embodiment, the stays 76c are arranged near to the end portions of the respective sides, as illustrated in FIG. 4, avoiding the positions near to the position of the storage hole 18a where the ring screw 60 is arranged, in order to secure a screw margin as much as possible in view of vibration resistance. Herein, the bracket 76 and the stator 20 can be connected together by, for example, screwing, welding, soldering, adhesion, caulking, or the like.

The stator 20 is arranged in the air not influenced by the pressure of a refrigerant. Accordingly, it is sufficient that the stator 20 is fixed with the strength that can withstand the vibrations occurring in an environment in which the control valve 10 is applied, for example, in an environment in which the control valve 10 is mounted in a vehicle; and the stator 20 is not required to be fixed with the strength as much as that for the can 22 required to be fixed with pressure-resistant strength. Accordingly, the screw margin of the screw member 24 is sufficient to have several threads. As a result, the size of the body 18 can be minimized, as far as the outlet port 12 and the inlet port 14 can be formed and the drive mechanism 38 and valve element 28, etc., can be housed. That is, it is not necessary to separately secure a screw margin for fixing the stator 20, which can contribute to the miniaturization of the body 18.

In the example illustrated in FIG. 4, etc., the screw member 24 is used as a means for fixing the stator 20 to the body 18, and in this case, large fixing strength is not needed by fixing the stator 20 separately from the can 22 influenced by the pressure of a refrigerant, as described above. Accordingly, a screw member, having fixing force (fastening force) smaller than that of the first fixing means, can be adopted, as far as the vibration resistance, which is said to be necessary in terms of design, is secured, thereby allowing the fixing structure to be miniaturized and simplified. Further, a fixing means, such as, for example, caulking, welding, soldering, adhesion, or the like, can be adopted as the second fixing means, as far as the vibration resistance, which is said to be necessary in terms of design, is secured, thereby allowing the same advantages as those in the present embodiment to be obtained.

Furthermore, the fixation means for the can 22, required to have pressure resistance, and that for the stator 20, not required to have pressure resistance, can be selected differently from each other, which can contribute to an improvement in design flexibility and fix the can 22 and the stator 20 with optimal fixing force, respectively, thereby allowing the reliability with respect to the pressure resistance and the vibration resistance of the control valve 10 to be improved.

In the aforementioned example, an example in which the stator 20 and the bracket 76 are used has been described, but it is only required that the stator 20 can be fixed to the body 18 with the second fixing means. Accordingly, the stator 20 may be directly fixed to the body 18 by, for example, providing a stay in a stator case that forms the stator 20 (case in which the exciting coil 58 is housed), which can provide the same advantages as those in the present embodiment. In this case, the number of components and the assembly man-hour can be reduced. In the example illustrated in FIG. 2, a structure, in which the screw member 24 is screwed in a direction perpendicular to the valve opening and closing direction in an upper portion of the side surface of the body 18, has been described, but the position where the screw member 24 is fastened can be changed by appropriately selecting the extended length of the stay 76*c*. For example, if the screw member 24 is present at the position illustrated in FIG. 2, the screw member 24 sometimes interferes with another component in some component layouts of an air conditioner in which the control valve 10 is mounted. In such a case, the position of the screw member 24 may be shifted to a lower position of the body 18 by adjusting the length of the stay 76*c*. Alternatively, a structure may be adopted, in which the bracket 76 is fixed to the body 18 by extending the stay 76*c* to the bottom of the body 18 (surface opposite to the surface to which the can 22 is attached), while the positions of the outlet port 12 and the inlet port 14 are being avoided, and by screwing the screw member 24 into the bottom of the body 18.

A valve opening degree of the control valve 10 thus configured can be adjusted by controlling the drive of the stepping motor 16. Hereinafter, the movements will be described. A non-illustrated controller computes the number of driving steps of the stepping motor 16 in accordance with a preset opening degree, and supplies a drive current (drive pulse) to the exciting coil 58 via a signal line 58*a*. Thereby, the rotor 47 rotates. As illustrated in FIGS. 2 and 3, the male thread 46*a*, provided on the outer surface of the inner cylinder 46 fixed to the lower end of the rotor core 48, is engaged with the female thread 40*a*, provided on the inner surface of the outer cylinder 40 fixed to the body 18. Accordingly, when the rotor core 48 rotates, the rotor core 48 itself and the inner cylinder 46 fixed thereto move in the axis line direction with respect to the shaft 68 supported by the can 22, in accordance with the thread pitch of the male thread 46*a* and the female thread 40*a*. For example, when the stepping motor 16 rotates in the valve opening direction from the state of FIG. 2, the inner cylinder 46 moves in the valve opening direction such that the flange 28*c* of the valve element 28 contacts the upper end of the fixing bush 56 fixed to the end portion of the inner cylinder 46, thereby allowing the valve to be opened by pulling up the valve element 28. In the state where the fixing bush 56 and the flange 28*c* contact each other to initiate the valve opening, the valve element 28 is pressed onto the fixing bush 56 with the ball 54 biased by the spring 52. Accordingly, a relative relationship between the inner cylinder 46 and the valve element 28 is maintained at a constant position (fixed position), and hence a lift-up amount of the inner cylinder 46 and a valve opening amount are proportional to each other. That is, a valve opening amount can be precisely controlled by controlling the number of the rotation of the stepping motor 16.

On the other hand, when the valve is made to be closed, the stepping motor 16 is made to rotate in a direction reverse to that occurring when the valve is opened, so that the inner cylinder 46 moves in the valve closing direction. Also in this case, the valve element 28 is pressed onto the fixing bush 56 with the ball 54 biased by the spring 52, and hence a relative relationship between the inner cylinder 46 and the valve element 28 is maintained at a constant position (fixed position) and a lift-down amount of the inner cylinder 46 and a valve opening amount are proportional to each other. When a portion of the valve element 28, where the large-diameter portion 28*a* and the needle portion 28*b* are switched to each other, contacts the valve seat M, a valve-closed state is satisfied and the flange 28*c* of the valve element 28 leaves the fixing bush 56. However, the valve element 28 receives the biasing force of the spring 52 via the ball 54, and hence the valve-closed state is maintained by actuating force in accordance with the biasing force of the spring 52. In this case, because the valve element 28 is pressed onto the valve seat M substantially by the biasing force of the spring 52, excessive lift-down of the inner cylinder 46, even if it occurs, is absorbed by the compression of the spring 52, thereby allowing the valve element 28 and the guide member 30 to be prevented from being damaged.

Figure 6:
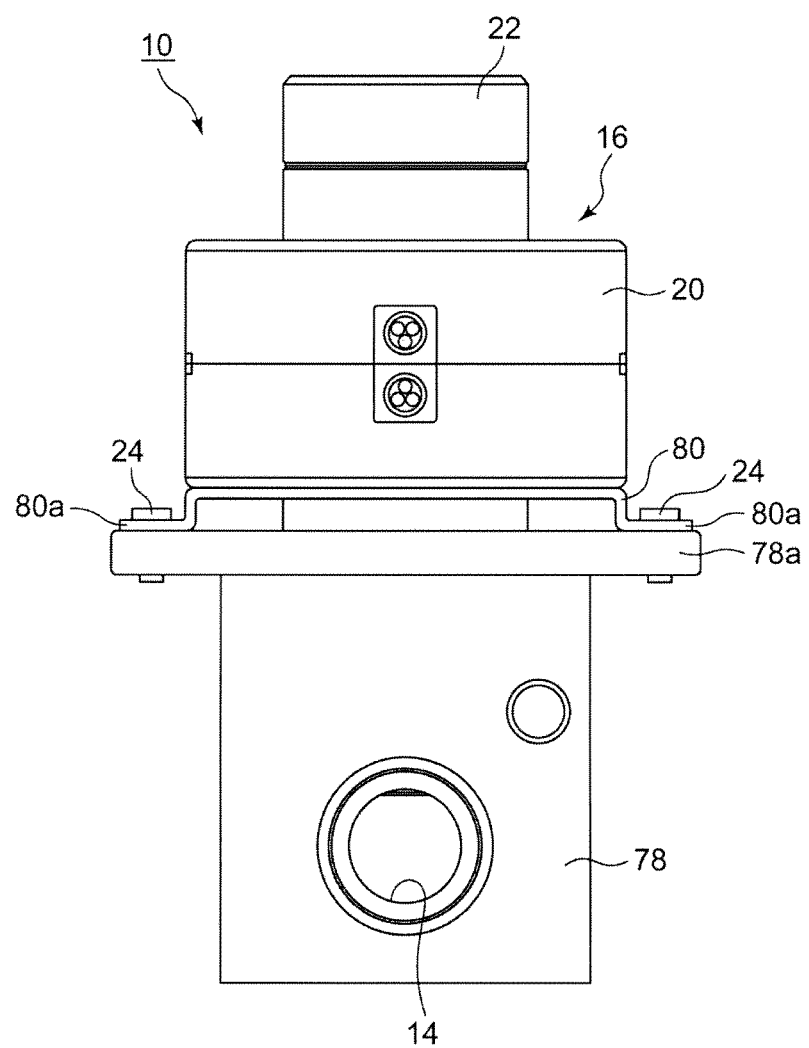
FIG. 6 is a view illustrating another structure for fixing the stator.

FIG. 6 is a view illustrating another structure for fixing the stator 20. Because the basic structure of the control valve 10 is the same as that in FIG. 2, except that a structure for fixing the stator 20 is only different therefrom, description of the basic structure will be omitted.

As illustrated in FIG. 6, a body 78 of the control valve 10 has a flange portion 78*a* at the upper end portion thereof. That is, the stator 20 is fixed via a bracket 80 by extending the flange portion 78*a* in parallel to a surface to which the can 22 is fixed and with the screw member 24, the second fixing means, being screwed with a female thread formed in the flange portion 78*a*. In this case, the bracket 80 can be obtained, for example, by pressing a metal plate, similarly to the bracket 76 illustrated in FIG. 5. That is, an opening, through which the can 22 is inserted, is formed in the central portion of a thin plate material, and a stay 80*a*, having a hole through which the screw member 24 is inserted, is formed by being folded back. In this case, the stay 80*a* is folded back so as to be parallel to the flange portion 78*a*. Thus, with a structure in which the stator 20 is fixed by forming the flange portion 78*a* in the body 78, a direction in which the screw member 24 is accessed can be made the same as the shaft direction of the control valve 10. Accordingly, disassembly work can be easily performed, for example, when the control valve 10 needs to be broken down for maintenance, parts exchange, or the like, after being mounted in a vehicle. Herein, the stator 20 is not influenced by the pressure of a refrigerant, and hence it is only required that vibration resistance is secured. Accordingly, the strength of the flange portion 78*a* is not required to be as large as that in the case where the stepping motor 16 is entirely housed in a pressure-resistant container, and the flange portion 78*a* is formed into a thin shape. That is, an area under the flange portion 78*a* becomes unnecessary, and therefore the shape (width) of the body 78 under the flange portion 78*a* can be made to be substantially the same as that of the body 18. Accordingly, a material for the body 78 can be reduced, which can contribute to cost reduction, weight reduction, and miniaturization.

Hereinafter, variations of the components of the control valve 10 will be described. Referring back to FIG. 3, the shape of each of the female thread 40a formed in the outer cylinder 40 and the male thread 46a formed in the inner cylinder 46 can be appropriately selected. For example, a triangular thread can be adopted. In the present embodiment, however, a trapezoidal thread is particularly adopted. Because the pressure angle of a triangular thread is larger than that of a trapezoidal thread, a screw efficiency resulting from friction is lower. That is, a load imposed on a triangular thread is larger than that imposed on a trapezoidal thread, and hence a triangular thread is more likely to experience sliding wear than a trapezoidal thread. Because the drive mechanism 38 of the embodiment is exposed to a high-pressure refrigerant, and a structure, which can withstand a high imposed load under a high-pressure environment by using a trapezoidal thread, is adopted.

In the present embodiment, in order to suppress both wear due to the sliding occurring when the valve element 28 is opened and closed, and that due to the sliding friction resulting from the vibrations occurring when mounted in a vehicle, for example, a stainless steel material is used as a base material of the outer cylinder 40 and the inner cylinder 46. Further, in order to improve the hardness of the base material, a surface treatment may be performed thereon. The type of the surface treatment can be appropriately selected. The hardness can be improved by performing, for example, a nitriding treatment on the surface of each of the female thread 40a in the outer cylinder 40 and the male thread 46a in the inner cylinder 46, which can further improve the wear resistance. As the nitriding treatment, for example, the treatment described in Japanese Patent Application Publication No. 2001-011630 can be used. In this case, a carbon coating able to function as a solid lubricant is formed on the surface of the treated material, which can reduce the sliding friction between the female thread 40a and the male thread 46a. Further, by forming the drive mechanism 38, such as the outer cylinder 40 and the inner cylinder 46, with a stainless steel material, the drive mechanism 38 is not influenced by the magnetic force generated by the exciting coil 58, which can suppress a vibration from being generated by the magnetic force. Also in this point, the wear, which may be generated in each of the female thread 40a in the outer cylinder 40 and the male thread 46a in the inner cylinder 46, can be reduced.

When a thread is formed, form rolling is generally used, but residual stress may remain in that case. When a nitriding treatment is performed on the surface of a thread, as described above, it is necessary to perform the treatment in a high-temperature environment, and hence a thread portion and its peripheral area may be deformed with the residual stress being released. Accordingly, in the present embodiment, the female thread 40a in the outer cylinder 40 and the male thread 46a in the inner cylinder 46 are formed by cutting to reduce occurrence of residual stress while they are being processed. That is, even when a surface treatment, as described above, is performed on a thread, it is made that a deformation is hardly generated. As a result, the control valve 10 can be made to work at a high imposed load by reducing the sliding friction possibly occurring while the valve element 28 is working. Herein, it is desirable to appropriately select the thread pitch of each of the female thread 40a in the outer cylinder 40 and the male thread 46a in the inner cylinder 46 according to the specification of the control valve 10. For example, by making the thread pitch small, the resolution occurring when the valve element 28 is opened and closed is improved, thereby allowing valve opening and closing to be precisely controlled.

Preferred embodiments of the present invention have been described above, but it is needless to say that the invention should not be limited to the specific embodiments and various variations may be made within the scope of the technical idea of the invention.

In each of the aforementioned embodiments, an example has been described, in which each of the guide part 70 of the shaft 68 and the engagement part 72a of the rotation stopper 72 is formed into a spiral shape by a coil-shaped member, as illustrated in FIG. 2. In a variation, another screw mechanism may be adopted, in which, for example, the guide part 70 of the shaft 68 has a male thread portion and the engagement part 72a of the rotation stopper 72 has a female thread portion. That is, it is only required that a mechanism for converting a rotational motion into a translational motion is formed by both the components.

In the present embodiment, a structure is adopted, in which the guide member 30 is formed separately from the body 18 and is fixed to the communication passage 26 formed in the body 18, as described with reference to FIGS. 2 and 3. In another embodiment, however, a structure, in which a valve seat is directly formed in the body 18, may be adopted. In this case, the number of components can be reduced. On the other hand, in the case of a structure, in which the guide member 30 is formed separately from the body 18 and is fixed to the communication passage 26 formed in the body 18, as in the present embodiment, the work for matching the axis line of the valve element 28 and that of the guide member 30 to each other, both the two components being positioned by the outer cylinder 40 and the inner cylinder 46, can be completed in the stage before the assembly into the body 18, regardless of the communication passage 26 in the body 18. As a result, the work for matching the axis line of each component together can be done easily, and thereby: the assembling work efficiency can be improved; and leak of a refrigerant and a decrease in the accuracy of valve opening and closing, which occur due to shaft misalignment, can be prevented.

In the embodiment illustrated in FIGS. 2 and 3, an example has been described, in which the ring screw 60 is used as the first fixing means for fixing the can 22. However, the first fixing means can be appropriately selected, as far as the can 22 is fixed in such a way that the airtightness of a pressure space formed therein is maintained, which can provide the same advantages as those in the present embodiment. For example, the can 22 may be fixed by a screw that is screwed in the valve opening and closing direction after a hole, through which the screw is to be inserted, is formed in the fixed portion 22c of the can 22. In this case, in order to secure pressure resistance, it is desirable to fix the can 22 with a plurality of screws. When a plurality of screws are used as the first fixing means, component cost can be reduced more easily than the case where the ring screw 60 is used. Further, the can 22 can be fixed without using a special jig necessary for fastening the ring screw 60. In this case, however, it is necessary to fix the can 22 with screws at positions outside the O-ring 62, avoiding the position where the O-ring 62 on the lower surface of the fixed portion 22c is arranged, which may incur an increase in the width of the body 18 (width in a direction perpendicular to the valve opening and closing direction). On the other hand, when the ring screw 60 is used, the O-ring 62 can be arranged on the bottom because the screw portion is formed on the side surface. That is, unlike the case where the can 22 is fixed with a screw that is screwed in the valve opening and closing direction, it is not necessary to take into consideration the O-ring 62, which never incurs an increase in the width of the body 18.

In the aforementioned embodiments, a control valve, configured to control the flow rate of a refrigerant between an inlet port and an outlet port, has been described as an example. A structure for fixing a stator according to the present embodiment can be applied to a control valve in which: a pressure space where the pressure of a refrigerant acts and a non-pressure space where the pressure of a refrigerant does not act are defined by a can; and the stator is arranged at the outer circumference of the can, which can provide the same advantages as those in the embodiment. The configuration of the valve element 28, the guide member 30, the drive mechanism 38, and rotor 47, etc., and the arrangement of the outlet port 12 and the inlet port 14 are exemplary only, and a structure for fixing a stator according to the embodiment can be applied to a control valve, in which the stator is arranged at the outer circumference of a can, even if the control valve has a different shape or structure, thereby allowing the same advantages to be obtained.

In the present embodiment, an example has been described, in which a control valve driven by a stepping motor is used in an automotive air conditioner; however, the control valve can be applied to various applications, not limiting to automobiles. For example, when the control valve is applied to a residential air conditioner, the same advantages as those in the present embodiment can be obtained. In the case of residential use, a demand for vibration resistance is not so high as that in vehicle use, and hence when the bracket 76 is fixed, caulking, fitting-in, spot welding, and soldering, etc., the fixing force of each of which is smaller than that of the fixation with the screw member 24, may be adopted as the second fixing means, instead of the screw member 24. In this case, the second fixing means can be selected from wider options and design flexibility is improved.

What is claimed is:

1. A control valve driven by a stepping motor, comprising:
    a body having an inlet port for introducing a refrigerant from an upstream side, an outlet port for delivering a refrigerant to a downstream side, and a valve hole that communicates the inlet port and the outlet port together;
    a valve element configured to open and close a valve section by moving toward and away from the valve hole;
    a drive mechanism configured to drive the valve element in an opening and closing direction of the valve section;
    a stepping motor including both a rotor for operating the drive mechanism and a stator for rotationally driving the rotor; and
    a can that is a cylindrical member covering a space where the valve element and the drive mechanism are arranged and involving the rotor and that defines a pressure space where pressure of the refrigerant acts and a non-pressure space where pressure of the refrigerant does not act, wherein the can is fixed to the body with a first fixing means,
    wherein the stator is arranged at an outer circumference of the can and fixed to the body with a second fixing means, and
    wherein the second fixing means substantially does not fix the can.

2. The control valve according to claim 1, wherein the second fixing means is a screw member.

3. The control valve according to claim 1, wherein the second fixing means fixes the stator by using a first wall surface different from a second wall surface to which the can is fixed.

4. The control valve according to claim 1, wherein the body has a flange portion extending in parallel to a fixing surface to which the can is fixed, and wherein the second fixing means fixes the stator to the flange portion.

5. The control valve according to claim 1, wherein the first fixing means is a screw member.

6. The control valve according to claim 5, wherein the screw member is an annular ring screw, and a lower end opening portion of the can is positioned between the ring screw and the body with a male thread, formed in an outer circumferential surface of the ring screw, being screwed with a female thread, formed in an inner circumferential surface of a storage hole formed in the body.

* * * * *